United States Patent
Pal et al.

(10) Patent No.: US 9,935,968 B2
(45) Date of Patent: Apr. 3, 2018

(54) SELECTIVE TRAFFIC ANALYSIS AT A COMMUNICATION NETWORK EDGE

(71) Applicant: Avaya Inc., Basking Ridge, NJ (US)

(72) Inventors: Biswajyoti Pal, Maharashtra (IN); Manish Chatterjee, West Bengal (IN)

(73) Assignee: AVAYA, INC., Basking Ridge, NJ (US)

( * ) Notice: Subject to any disclaimer, the term of this patent is extended or adjusted under 35 U.S.C. 154(b) by 194 days.

(21) Appl. No.: 14/932,043

(22) Filed: Nov. 4, 2015

(65) Prior Publication Data

US 2017/0126725 A1    May 4, 2017

(51) Int. Cl.
*H04L 29/06* (2006.01)
*H04L 12/24* (2006.01)
*H04L 12/26* (2006.01)

(52) U.S. Cl.
CPC .......... *H04L 63/1433* (2013.01); *H04L 41/14* (2013.01); *H04L 43/022* (2013.01); *H04L 63/20* (2013.01); *H04L 65/60* (2013.01)

(58) Field of Classification Search
CPC ... H04L 41/14; H04L 43/022; H04L 63/1433; H04L 63/20; H04L 65/60
USPC ................................................ 726/1, 22–25
See application file for complete search history.

(56) References Cited

U.S. PATENT DOCUMENTS

| | | | |
|---|---|---|---|
| 2007/0180490 A1* | 8/2007 | Renzi | G06F 21/577 726/1 |
| 2010/0142522 A1* | 6/2010 | Gardner | H04L 1/0009 370/389 |
| 2014/0115654 A1* | 4/2014 | Rogers | H04L 63/0218 726/1 |
| 2017/0085595 A1* | 3/2017 | Ng | H04L 63/20 |
| 2017/0104790 A1* | 4/2017 | Meyers | H04L 63/20 |

FOREIGN PATENT DOCUMENTS

WO    WO 2015/199719    * 12/2015

* cited by examiner

*Primary Examiner* — Baotran N To (57) ABSTRACT

Embodiments disclosed herein provide systems and methods for recording for analyzing traffic at an edge of a communication network. In a particular embodiment, a method provides processing a first portion of data packets directed into the communication network from outside of the communication network to determine whether a first sampling policy adequately assesses risk to the communication network. Upon determining that the first sampling policy does not adequately assess the risk to the communication network, the method provides adjusting the first sampling policy. The method further provides identifying a second portion of the data packets based on the first sampling policy. An amount of data packets included in the first portion of the data packets is larger than or equal to an amount of data packets included in the second portion of the data packets.

18 Claims, 7 Drawing Sheets

SELECTIVE TRAFFIC ANALYSIS AT A COMMUNICATION NETWORK EDGE

TECHNICAL FIELD

Aspects of the disclosure are related to analyzing traffic traversing an edge of a communication network and, in particular, to selectively sampling the traffic and performing analysis workflows on the sampled traffic.

TECHNICAL BACKGROUND

Especially in large enterprise type communication networks, correspondingly large amounts of network data traffic passes into and out of the network. With this large amount of data there is an increased likelihood that at least a portion of the data is a security threat, or otherwise undesirable, to the communication network. While smaller networks can relatively easily analyze traffic traversing into or out of the network, larger networks have enough traffic that it become more difficult to analyze all of it.

Moreover, data traffic may be carrying real-time communications, such as voice and/or video communications between systems inside the communication network and systems outside of the communication network. Real-time communications cannot afford to be delayed when traversing between two endpoints without adversely effecting the user experience. Such delays could cause audio and video in media to not be synchronized, cause the media to stutter when being presented, or otherwise delay communications such that users cannot carryon a normal pace of communication. Accordingly, even when there is a large amount of data that should be analyzed for security issues, real-time communications should not be delayed by that analysis to the point of adversely effecting the communications.

OVERVIEW

Embodiments disclosed herein provide systems and methods for recording for analyzing traffic at an edge of a communication network. In a particular embodiment, a method provides processing a first portion of data packets directed into the communication network from outside of the communication network to determine whether a first sampling policy adequately assesses risk to the communication network. Upon determining that the first sampling policy does not adequately assess the risk to the communication network, the method provides adjusting the first sampling policy. The method further provides identifying a second portion of the data packets based on the first sampling policy. An amount of data packets included in the first portion of the data packets is larger than or equal to an amount of data packets included in the second portion of the data packets.

In some embodiments, the method provides performing a first security workflow on at least a subset of the second portion of the data packets and rejecting unsecure packets of the second portion of the data packets in accordance with the first security workflow.

In some embodiments, performing the first security workflow occurs in substantially real-time.

In some embodiments, upon determining that at least one process of the first security workflow should be reordered, the method provides reordering the at least one process within the first security workflow.

In some embodiments, determining that the at least one process of the first security workflow should be reordered comprises determining that the at least one process detects more of the unsecure packets than a second process positioned before the at least one process in order of the first security workflow. Also in those embodiments, reordering the at least one process within the first security workflow comprises ordering the first security workflow such that the at least one process is positioned before the second process in the first security workflow.

In some embodiments, adjusting the first sampling policy comprises performing a second security workflow on the first portion of data packets.

In some embodiments, the data packets represent a plurality of media streams and the second portion of the data packets represents a first media stream of the plurality of media streams.

In some embodiments, adjusting the first sampling policy comprises balancing a potential security risk on the communication network with processing resources required for each of a plurality of possible packet amounts for the second portion of the data packets.

In some embodiments, the first portion of the data packets comprises all of the data packets.

In some embodiments, receiving the first sampling policy from a user.

In another embodiment, an edge system is provided comprising a communication interface and a processing system. The communication interface is configured to receive data packets directed into the communication network from outside of the communication network. The processing system is configured to process a first portion of the data packets to determine whether a first sampling policy adequately assesses risk to the communication network and adjust the first sampling policy upon determining that the first sampling policy does not adequately assess the risk to the communication network. Also, the processing system is configured to identify a second portion of the data packets based on the first sampling policy. An amount of data packets included in the first portion of the data packets is larger than or equal to an amount of data packets included in the second portion of the data packets.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Enterprise communication networks typically place network elements (e.g. servers, routers, user systems, etc.) behind one or more edge systems. These edge systems are meant to direct traffic into and out of the enterprise communication network and, in some cases, protect the communication network from security threats or data traffic that is otherwise adverse to the network. Since many enterprise networks include systems therein that exchange traffic as part of real-time communication services for users, such as Session Initiation Protocol (SIP), Web Real-time Communications (WebRTC), or some other protocol for real-time communications, the edge systems cannot cause too much delay in those communications without adversely effecting the user experience for the users on either end of the communication.

In one example, an enterprise may house systems for communicating with agents of a contact center within its enterprise network. Depending on the number of contact center agents, there may be a very large amount of real-time communications being exchanged with user systems of those agents. The enterprise would not want its relationship with callers to be jeopardized due to slow downs caused by analyzing the packets carrying those communications.

Ideally, the edge systems of the network would have enough resources (e.g. processing power/capacity) to fully analyze all network traffic with little to no delay. However, this ideal situation cannot always be realized especially in networks having large amount of real-time traffic. Therefore, the examples below describe network scenarios that selectively analyze traffic to balance the network's ability to analyze traffic in real-time with the risk to the network that may be caused by allowing unanalyzed traffic through.

Figure 1:
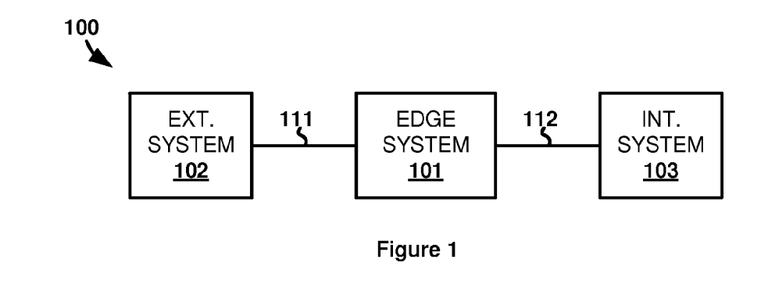
FIG. 1 illustrates a network communication environment for selectively analyzing traffic at a communication network edge.

FIG. 1 illustrates network communication environment 100 for selectively analyzing traffic at a communication network edge. Network communication environment 100 includes edge system 101, external communication system 102, and internal communication system 103. Edge system 101 and external communication system 102 communicate over communication link 111. Edge system 101 and internal communication system 103 communicate over communication link 112.

In operation, internal communication system 103 is located within an enterprise network that includes edge system 101 at an ingress/egress point of the enterprise network. It should be understood that, while the networks herein are described as enterprise networks, the term enterprise network is intended to describe any communication network having similar structure regardless of whether an enterprise operates the network. External communication system 102 and internal communication system 103 may be user end systems or may be intermediate systems in a communication path, such as gateways, application servers, etc.—including combinations thereof.

Figure 2:
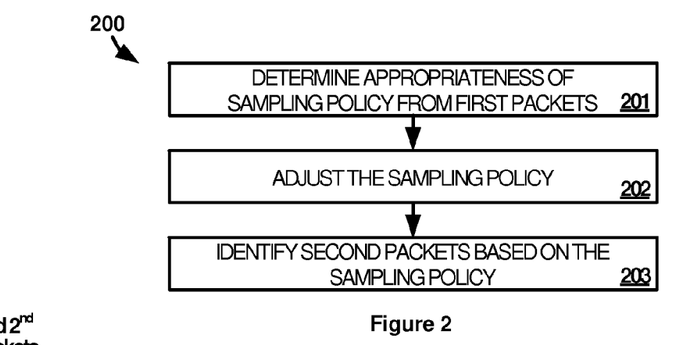
FIG. 2 illustrates a method of operating the network communication environment to selectively analyze traffic at a communication network edge.

FIG. 2 illustrates a method 200 of operating network communication environment 100 to selectively analyze traffic at a communication network edge. Method 200 provides edge system 101 processing a first portion of data packets directed into the communication network from outside of the communication network to determine whether a sampling policy adequately assesses risk to the communication network (201). In this example, edge system 101 processes packets transferred from external communication system 102 and directed to internal communication system 103. Although, in other examples, edge system 101 may process packets from any number of external systems. While the bulk of this disclosure focuses on real-time communications, the data packets may carry any type of information.

The sampling policy indicates which packets should be sampled, how many of the packets should be sampled, how often the packets should be sampled, or any other type of parameter applicable to selecting certain packets over others—including combinations thereof. The packets that should be sampled may be indicated by the sampling policy based on characteristics of the packets, such as packets that carry a certain media type (e.g. SIP, WebRTC, h.323, or some other type of communication), packets from certain domains, packets from certain networks, packets from certain network address ranges, packets from certain systems or system types, packets from systems or networks having given characteristics, or any other way of distinguishing packets—including combinations thereof.

Upon determining that the sampling policy does not adequately address the risk to the communication network, method 200 provides edge system 101 adjusting the first sampling policy (202). The risk to the communication network includes both consumer risk of the communication network being exposed to security threats (or otherwise unwanted packet traffic) and producer risk to communication throughput that may be caused by analyzing too many packets. For example, edge system 101 may determine that packets having a first set of characteristics pose a higher consumer risk to the communication network than currently accounted for by the sampling policy. At the same time, edge system 101 may determine that the producer risk can accommodate more packets being sampled, which may be due to spare capacity or due to reducing the amount of packets being sampled for other characteristic sets (e.g. upon determining that sampling for those other characteristic sets can be reduced relative to the first set of characteristics). As such, edge system 101 adjusts the sampling policy to indicate that more packets having the first set of characteristics should be sampled. The sampling policy being adjusted may be a default sampling policy, may be a sampling policy provided by a user (e.g. a network administrator), may be a sampling policy created from an adjustment in a previous iteration of method 200, or may be obtained from some other source.

Method 200 then provides edge system 101 identifying a second portion of the data packets based on the sampling policy (203). The amount of data packets included in the first portion of the data packets is larger than or equal to an amount of data packets included in the second portion of the data packets. That is, the first portion of the data packets may be the entirety of the data packets while, since the second portion of the data packets are selected using the sampling policy, it is likely that the second portion of the data packets will include less packets. The less data packets in the second portion of data packets is, the less resources are needed to analyze those packets. Accordingly, it is more likely that the second portion of the data packets can be analyzed in real-time than the first portion of the data packets.

Figure 3:
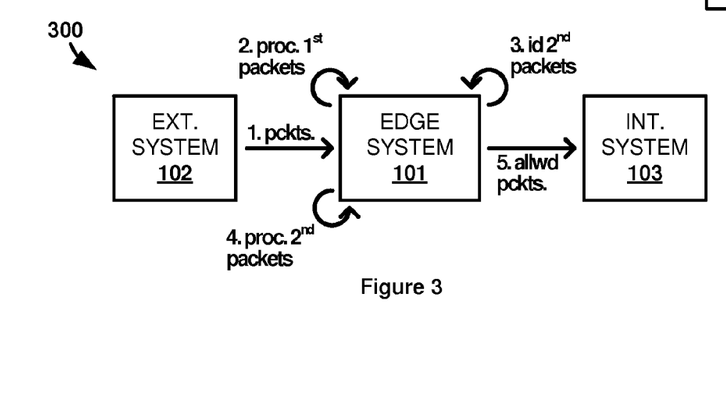
FIG. 3 illustrates an operational scenario of the network communication environment to selectively analyze traffic at a communication network edge.

FIG. 3 illustrates an operational scenario 300 of network communication environment 100 to selectively analyze traffic at a communication network edge. At step 1, data packets are received by edge system 101 from external communication system 102. The packets are directed to internal communication system 103. At step 2, edge system 101 processes a first portion of the packets to determine whether a sampling policy governing the selection of a second portion of the packets adequately balancing the consumer risk and the producer risk on the communication network. Should edge system 101 determine that the sampling policy is not adequately assess risk on the communication network, edge system adjusts the sampling policy to better assess the risk.

At step 3, a second portion of the incoming packets are identified for analysis based on the sampling policy. The sampling policy may indicate an amount or percentage of the incoming packets should be sampled (i.e. identified), which may be different for packets having different characteristics. For example, the sampling policy may indicate that 10% of all packets carrying a certain type of media should be sampled. More specifically, the sampling policy may indicate that edge system 101 should let 9 packets pass to internal communication system 103 and then sample packet number 10. 9 more packets will then be let through before another packet is sampled, and so on until packets are no longer received or the sampling policy is adjusted to indicate a different amount of packets should be sampled.

At step 4, the packets identified at step 3 as the second portion of the packets are then processed to determined whether any of the second portion of the packets pose a security risk, or are otherwise undesirable, to the communication network. When processing the second portion of the packets, edge system 101 may perform a workflow on the second portion of the packets to determine whether the second portion of the packets should be prevented from entering the communication network. The workflow may analyze the payloads of the second portion of the packets, may analyze header information in the second portion of the packets, may analyze each packet individually or in combination with other packets, or perform some other type of analysis on the second portion of the packets—including combinations thereof.

Steps 3 and 4 should occur in substantially real-time to ensure that any real-time communications being carried by the packets are not disrupted by processing delay. Continuing the example from above, since 9 packets are allowed to go to internal communication system 103 without being processed, the tenth packet should still arrive at internal communication system 103 shortly thereafter (if not determined to be a security threat to the communication network). Otherwise, the presentation of the media carried by the packets may be adversely effected due to the tenth packet not arriving on time for presentation.

At step 5, allowed packets are passed on to internal communication system 103. The allowed packets include both those packets of the second portion of the packets that were determined at step 4 to not pose a threat to the communication network and packets that were not included in the second portion of the packets. In some examples, when a packet is determined at step 4 to pose a threat to the communication network, then all other packets associated with that packet are prevented from entering the communication network. The associated packets may include other packets carrying a particular media stream, other packets carrying similar communication types, other packets transferred from or through a common source system, network, sub network, and the like, or some other reason for which multiple packets may be associated—including combinations thereof. For instance, if one or more packets in a particular media stream are included in the second portion of the packets and are determined to be threatening to the communication network, then that media stream as a whole may be prevented from reaching internal communication system 103 at step 5.

It should be understood that the process above continues as packets continue to stream from external communication system 102. Specifically, steps 1 and 3-5 will occur continually and in substantially real-time to avoid disturbing any real-time communications that may be carried by the packets. Once a packet is selected as part of the second portion of the packets, that packet is analyzed. Due to the streaming nature of data packets, it is not necessary that all packets that will be included in the second portion of the packets be identified before analysis can start. In contrast, step 2 may occur at a rate that is less than real-time. For example, the first portion of the packets that is analyzed at step 1 may be a much larger number of packets and may even include all packets received from external communication system 102. In addition to the greater number of packets, the first portion of the packets may be processed in a manner that would delay the packets too long for real-time communications (e.g. more thoroughly than step 4). As such, the analysis at step 2 is used to enhance the performance of steps 3 and 4, which occur substantially real-time. As step 2 adjusts the sampling policy step 3 uses the adjusted policy to continue selecting packets. For example, the sampling policy may be changed from 10% of packets to 25%. Thus, once the adjusted sampling policy is in place, step 3 begins selecting 25% of packets entering into edge system 101.

Referring back to FIG. 1, edge system 101 comprises a computer processing system and communication interface. Edge system 101 may also include other components such as a router, server, data storage system, and power supply. Edge system 101 may reside in a single device or may be distributed across multiple devices. Edge system 101 may comprise a communication gateway, firewall, Session Border Controller (SBC), Traversal Using Relays around NAT (Network Address Translation) (TURN) server, Representational State Transfer (REST) server, proxy server, or some other networking system—including combinations thereof.

External communication system 102 and internal communication system 103 each comprise communication circuitry and processing circuitry. The communication circuitry may include wired communication components and/or wireless communication components, such as an amplifier, filter, modulator, and signal processing circuitry. External communication system 102 and internal communication system 103 may also include a user interface, memory device, software, or some other communication components. External communication system 102 and internal communication system 103 may be a telephone, tablet, watch, computer, gateway, call router, application server, conferencing system, e-book, mobile Internet appliance, network interface card, media player, game console, or some other communication apparatus—including combinations thereof.

Communication links 111 and 112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111 and 112 could be direct links or may include intermediate networks, systems, or devices.

Figure 4:
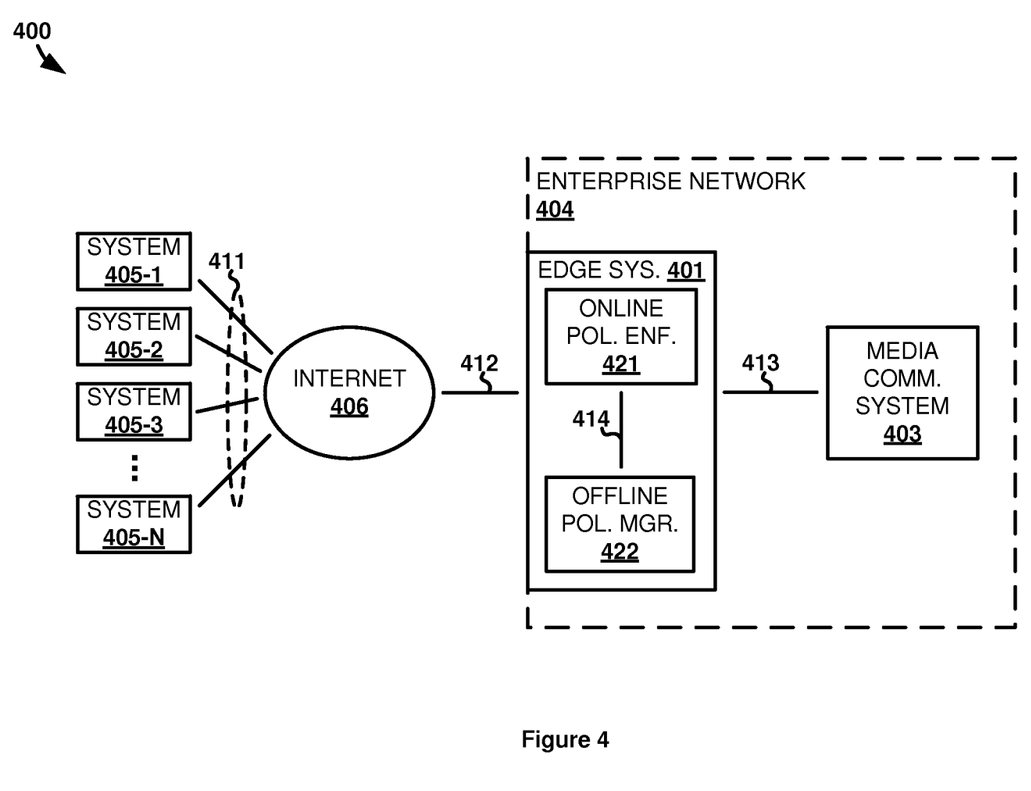
FIG. 4 illustrates another network communication environment for selectively analyzing traffic at a communication network edge.

FIG. 4 illustrates network communication environment 400 for selectively analyzing traffic at a communication network edge. Network communication environment 400 includes edge system 401, enterprise network 404, media communication system 403, external communication systems 405, and Internet 406. Edge system 401 includes online policy enforcer 421 and offline policy manager 422. Communication systems 405 and Internet 406 communicate over communication links 411. Internet 406 and edge system 401 communicate over communication link 412. Edge system 401 and media communication system 403 communicate over communication link 413. Online policy enforcer 421 and offline policy manager 422 communicate over communication link 414.

While illustrated as one element (i.e. edge system 401), offline policy manager 422 may be located in a separate device than online policy enforcer 421. Therefore, communication link 414 may be an internal link within edge system 401 (e.g. system bus) or an external link traversing at least a portion of enterprise network 404 (e.g. via a Ethernet link(s)). In some cases, online policy enforcer 421 and offline policy manager 422 may be implemented as software elements executing on a common processing system within edge system 401.

In this example, communication systems 405 are end systems, such as user systems, that generate packet traffic. However, in other examples, communication systems 405 may include intermediate systems. Communication systems 405 exchange communications media communications with media communication system 403. Media communication system 403 facilitates real-time media communications (e.g. audio and/or video calls) with enterprise network 404. In one example, media communication system 403 handles the routing of communications between communication systems 405 and agent systems within enterprise network 404 as part of a contact center environment. Media communication system 403 may use any type of protocol, such as SIP or WebRTC, to facilitate communications.

In operation, all packets received from external communication systems 405 pass through online policy enforcer 421 of edge system 401 on their way to media communication system 403. Some examples may include other edge systems in enterprise network 404 through which packets from other external communication systems pass. The other edge systems in those examples will operate similarly to edge system 401. Online policy enforcer 421 analyzes the received packets in substantially real-time so that media communications carried by the packets are not adversely effected. In this case, the amount of media communications passing between external communication systems 405 and media communication system 403 is large enough that online policy enforcer 421 cannot effectively analyze every packet.

Therefore, offline policy manager 422 analyzes the packets from external communication systems 405 and indicates which packets should be analyzed based on the producer and consumer risk to enterprise network 404. Specifically, offline policy manager 422 does not need to analyze the packets in real-time and can thereby analyze more packets and/or analyze the packets more thoroughly than if the packets needed to be analyzed in real time. This more thorough analysis allows offline policy manager 422 to determine whether online policy enforcer 421's packet selections are able to adequately assess risk on enterprise network 404.

Figure 5:
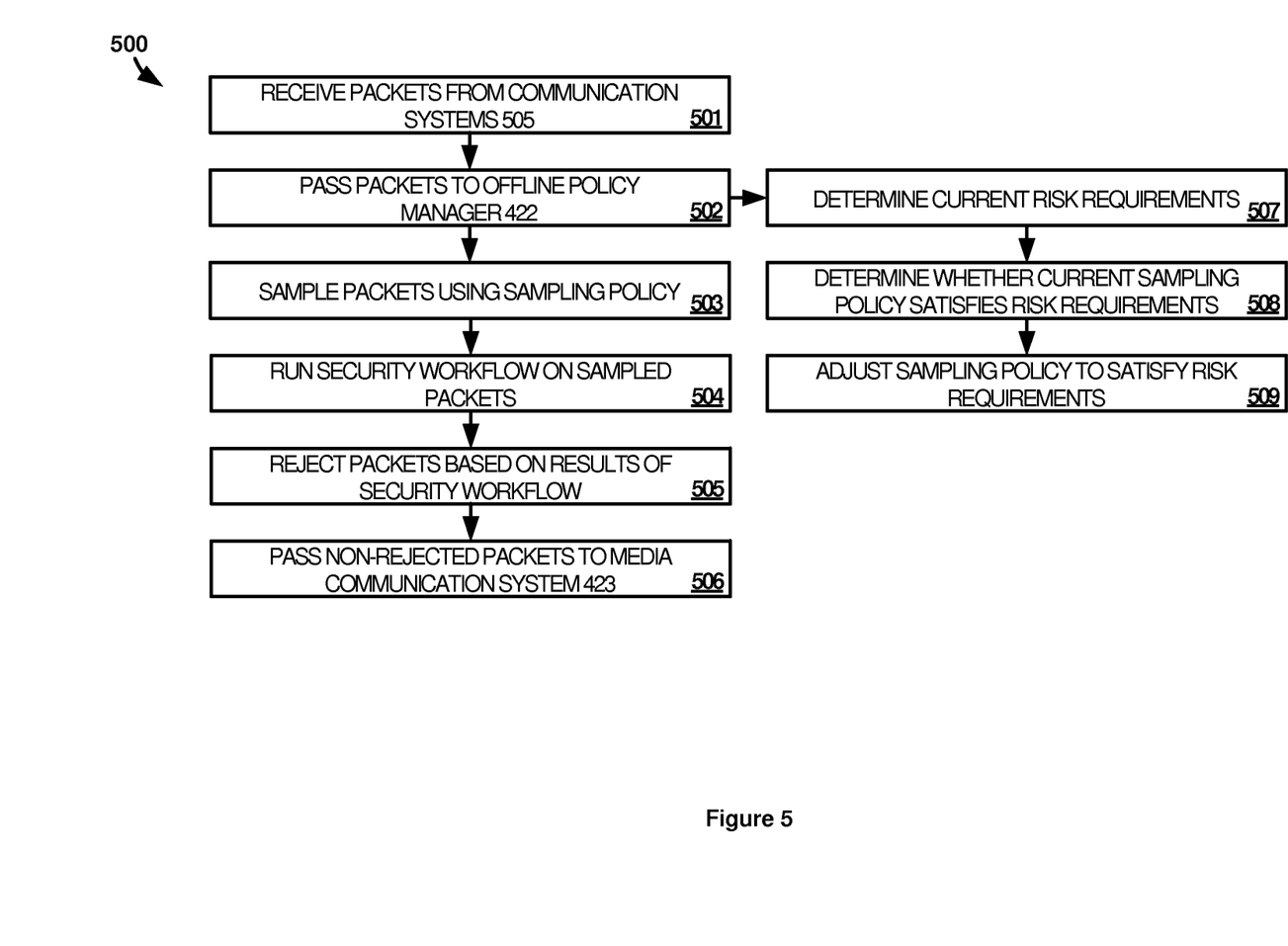
FIG. 5 illustrates a method of operating the other network communication environment to selectively analyze traffic at a communication network edge.

FIG. 5 illustrates a method 500 of operating network communication environment 400 to selectively analyze traffic at a communication network edge. Method steps 401-406 are performed by online policy enforcer 421 while method steps 407-409 are performed by offline policy manager 422. Online policy enforcer 421 receives packets from external communication systems 405 (501). The packets from each of external communication systems 405 carry media (e.g. audio and/or video) for real-time user communications directed to media communication system 403. In this example, all of the packets are copied and passed to offline policy manager 422 (502).

Additionally, online policy enforcer 421 samples the packets as they are received using a sampling policy (503). Initially, the sampling policy may be a default sampling policy, a sampling policy supplied by a user, a sampling policy generated by offline policy manager 422, or a sampling policy obtained from some other source. The sampling policy indicates which packets should be analyzed and which packets should be allowed to pass to media communication system 403 without being analyzed. The sampling policy may indicate a sampling size, a sampling rate, or some other quantifying parameter, for each individual packet type or groups of packet types. Thus, the sampling parameters may be different for packets having different characteristics (i.e. different packet types). The sampling policy may be embodied as a table, or other type of data structure, that sets forth sampling parameters for each set of packet characteristics (e.g. if packet has characteristic(s) X, then sample at Y rate). Any packets that are not sampled for analyses are allowed to continue on to media communication system 403.

Online policy enforcer 421 runs a security workflow on each of the sampled packets to analyze the sampled packets for security threats or otherwise undesirable traits (504). The security workflow may include one or more algorithms performed on the packets to identify media vulnerabilities and anomalies. Each of the algorithms may be performed in sequence or in parallel with one or more of the other algorithms. The algorithms may be used to detect viruses, denial of service attacks, media anomalies (e.g. packet supposed to be carrying media of one type but is actually carrying a different type), or some other type of unwanted packet traffic—including combinations thereof.

Different security workflows may be performed on packets having different characteristics. For example, different workflows may be created for packets from different external connections, such as type of communication system (e.g. personal or business computer), network from which the packets are received, application used to establish the communication (e.g. open web browser or dedicated communication application), or some other type of differentiator—including combinations thereof. At least initially, the security workflow(s) may be default workflows, may be supplied by a user, may be generated by online policy enforcer 421 or offline policy manager 422, or may be obtained from some other source. Over time, each security workflow may be adjusted based on the results of applying the workflow to the sampled packets. Online policy enforcer 421, offline policy manager 422, or some other system may analyze the results of the security workflows and adjust the workflows for future sampled packets.

If one or more of the algorithms run on the sampled packets identifies a security threat or abnormality, then at least the identified packets are rejected and not allowed to enter enterprise network 404 (505). Moreover, other packets associated with the identified packets may also be rejected. For example, packets for the media stream of the identified packets may all be blocked from entering enterprise network 404. Likewise, if multiple media streams having a common characteristic (e.g. coming from the same subnet) include offending packets, then all media streams having that common characteristic may be blocked from entering enterprise network 404.

Any packets that are not rejected based on the results of the security workflow(s) are allowed to pass into enterprise network 404 and media communication system 403 (506). The above steps are performed very quickly such that the non-rejected sampled packets can be sent through to media communication system 403 after analysis without disrupting the real-time nature of the media communications that they carry.

While method online policy enforcer 421 is analyzing the sampled packets in real-time, offline policy manager 422 is analyzing the copies of the packets received from online policy enforcer 421 at step 502. Offline policy manager 422 determines the current risk requirements for enterprise network 404 (507). The current risk may be received from a user, may be stored in offline policy manager 422's memory (from prior user input or otherwise), may be received from another system in enterprise network 404, or from some other source capable of supplying requirement information. The risk requirements indicate thresholds of producer and consumer risk for enterprise network 404. For example, the requirements may indicate an amount of packets that online policy enforcer 421 can process without adversely affecting real-time media communications. Additionally, the requirements may prioritize potential security threats, which would allow the sampling policy to focus on sampling packets of certain types rather than others (e.g. potential denial of service attacks over anomalous media types). The current risk requirements may change over time (e.g. a user may update risk requirements) and, therefore, offline policy manager 422 needs to know the current risk requirements each time the sampling policy is to be adjusted to best address those requirements.

Offline policy manager 422 then determines whether the current sampling policy properly satisfies the current risk requirements (508). Even if the current risk requirements have not changed since a previous iteration of step 508, the characteristics of packets in traffic being received at edge system 401 likely changes frequently. Therefore, offline policy manager 422's determination of whether the sampling policy satisfies the current risk requirements also depends on analysis of the packets received at step 502.

In some examples, offline policy manager 422 performs security workflows on the packets in a similar manner to online policy enforcer 421 at step 504. However, since offline policy manager 422 does not need to keep up with real-time communications, the security workflows used by offline policy manager 422 may include more algorithms that detect security threats, different algorithms, more complex algorithms, or algorithm arrangements that would not otherwise be able to be performed on packets without disrupting real-time communications. Likewise, the amount of packets that are processed by offline policy manager 422 may be much greater than the amount of packets processed by online policy enforcer 421 and processing such high volumes may not feasible without disrupting real-time communications. Additionally, the algorithms used by offline policy manager 422 may indicate packets that should be monitored even though those packets do not necessarily include a security threat.

If it is determined that the sampling policy currently being used by online policy enforcer 421 does not satisfy the current risk requirements, then offline policy manager 422 adjusts the sampling policy (step 509). For example, processing the packets at step 508 may determine that the packets coming from external communication systems 405 into edge system 401 include a higher number of packets from a suspect network (e.g. from a network in a list of networks that are flagged as housing potential security threats). The current sampling policy may not sample enough packets having that network origin characteristic and, therefore, the sampling policy is adjusted such that online policy enforcer 421 samples more packets having that characteristic. In some cases, online policy enforcer 421 may have enough spare capacity to account for increasing the sampling of packets having certain characteristics. However, in other cases, sampling of packets having other characteristics may need to be reduced to free up processing resources in online policy enforcer 421. In those cases, priorities for risk to different types of threats, which are included in the current risk requirements, may be used to prioritize which packet characteristics should be sampled over others. In some instances, a minimum sampling amount(s) may be specified in the risk requirements that specifies a minimum amount of sampling that is allowed for packets having certain characteristics.

To adjust the sampling policy, offline policy manager 422 may itself change the sampling policy and then send a copy of the changed sampling policy to online policy enforcer 421. Alternatively, offline policy manager 422 may instruct online policy enforcer 421 on how to change the sampling policy and online policy enforcer 421 changes the sampling policy in response to the instruction. Other ways in which a policy can be changed may also be used. The current sampling policy that is being adjusted may be a default sampling policy, a sampling policy provided by a user, a sampling policy resulting from a previous adjustment, or a sampling policy obtained by other means. Once the policy has been adjusted, online policy enforcer 421 begins using the adjusted policy in step 503.

Figure 6:
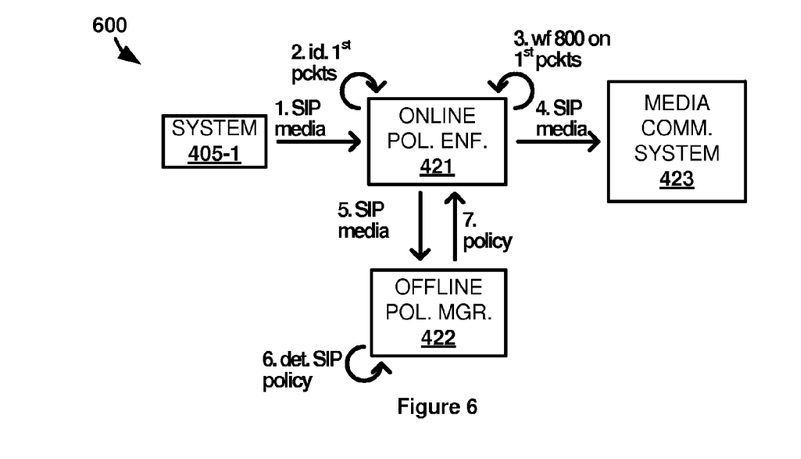
FIG. 6 illustrates an operational scenario of the other network communication environment to selectively analyze traffic at a communication network edge.

FIG. 6 illustrates an operational scenario 600 of network communication environment 400 to selectively analyze traffic at a communication network edge. In scenario 600, external communication system 405-1 is exchanging media communications established using SIP with media communication system 423. The media may comprise user communications (e.g. voice and/or video) between a user of external communication system 405-1 and an agent operating an agent communication system coupled to media communication system 423. Accordingly, at step 1, media for the communication is transferred from external communication system 405-1. The media is only one stream of many media streams that edge system 401 receives from external communication systems 405.

Figure 8:
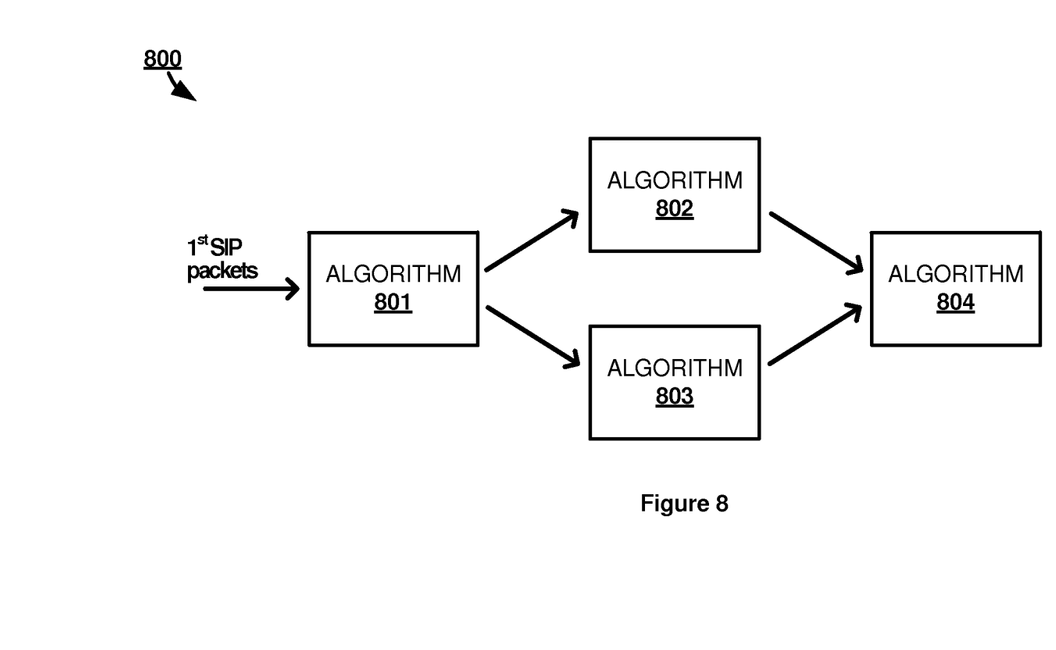
FIG. 8 illustrates a workflow of the network communication environment to selectively analyze traffic at a communication network edge.

Packets carrying the media are identified for sampling at step 2 using a sampling policy by online policy enforcer 421. Online policy enforcer 421 then performs workflow 800 on the sampled packets. FIG. 8 illustrates workflow 800 that online policy enforcer 421 uses to process the sampled packets. In this example, workflow 800 is specified for use on packets having the characteristics of the sampled packets from external communication system 405-1. For instance, workflow 800 may be designated for use on SIP media packets, on packets received from external communication system 405-1 specifically, on packets received from external communication system 405-1's subnet, or on packets having some other characteristic—including combinations thereof. Thus, workflow 800 may also be used on communications other than those received from external communication system 405-1. Workflow 800 includes algorithms 801-804. Each algorithm 801-804 may analyze the packets for a different type of security threat, such as viruses, denial of service attacks, media type anomalies (e.g. not the SIP media that was expected from external communication system 405-1), or some other type of unwanted data—including combinations thereof. The packets are first processed by algorithm 801, then by algorithms 802 and 803 in parallel, and then algorithm 804. If during any algorithm a packet is determined to be a threat, then the packet is rejected. In some cases, an algorithm may apply to each packet individually while in other cases the algorithm may consider multiple packets, as may be the case if, for example, the algorithm is designed to find a pattern or trend within the packets.

Referring back to scenario 600, packets that are not rejected during the application of workflow 800 are allowed to continue on to media communication system 423. Those packets that are rejected are not allowed to enter enterprise network 404. Also, packets associated with the rejected packets may be rejected from entering enterprise network 404. Accordingly, for example, if any packets of the media stream from external communication system 405-1 are rejected, then the entire media stream may be rejected as well. Likewise, other packets from the same network as external communication system 405-1 may be rejected in addition to those from external communication system 405-1.

While online policy enforcer 421 is performing steps 1-4 in real-time, offline policy manager 422 receives copies of the SIP media packets at step 5. The media packets are then processed to determine whether the current sampling policy being used by online policy enforcer 421 in step 2 is adequately assessing the risks on enterprise network 404 and adjusts that policy if necessary at step 6. The adjusted sampling policy, if there is one, is then sent to online policy enforcer 421 at step 7 for use during the real-time sampling by online policy enforcer 421 at step 2.

Figure 7:
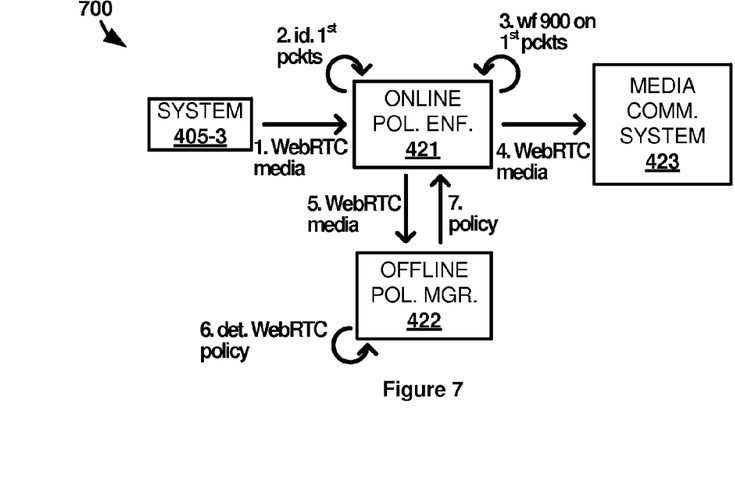
FIG. 7 illustrates an operational scenario of the other network communication environment to selectively analyze traffic at a communication network edge.

FIG. 7 illustrates an operational scenario 700 of network communication environment 400 to selectively analyze traffic at a communication network edge. Steps 1-7 occur in much the same way as was described above with respect to operational scenario 600. However, in this example, external communication system 405-3 is exchanging media communications established using WebRTC with media communication system 423. These WebRTC media communications may be occurring concurrently with the SIP communications from external communication system 405-1 in scenario 600. The sampling policy used by online policy enforcer 421 at step 2 may indicate different sampling parameters than the parameters used for the SIP media packets from external communication system 405-1. The different parameters may be due to the media being WebRTC based instead of SIP, may be due to being received from external communication system 405-3 rather than external communication system 405-1, may be due to the communication network in which external communication system 405-3 is located, or may be due to some other different characteristic of the WebRTC media packets—including combinations thereof.

Figure 9:
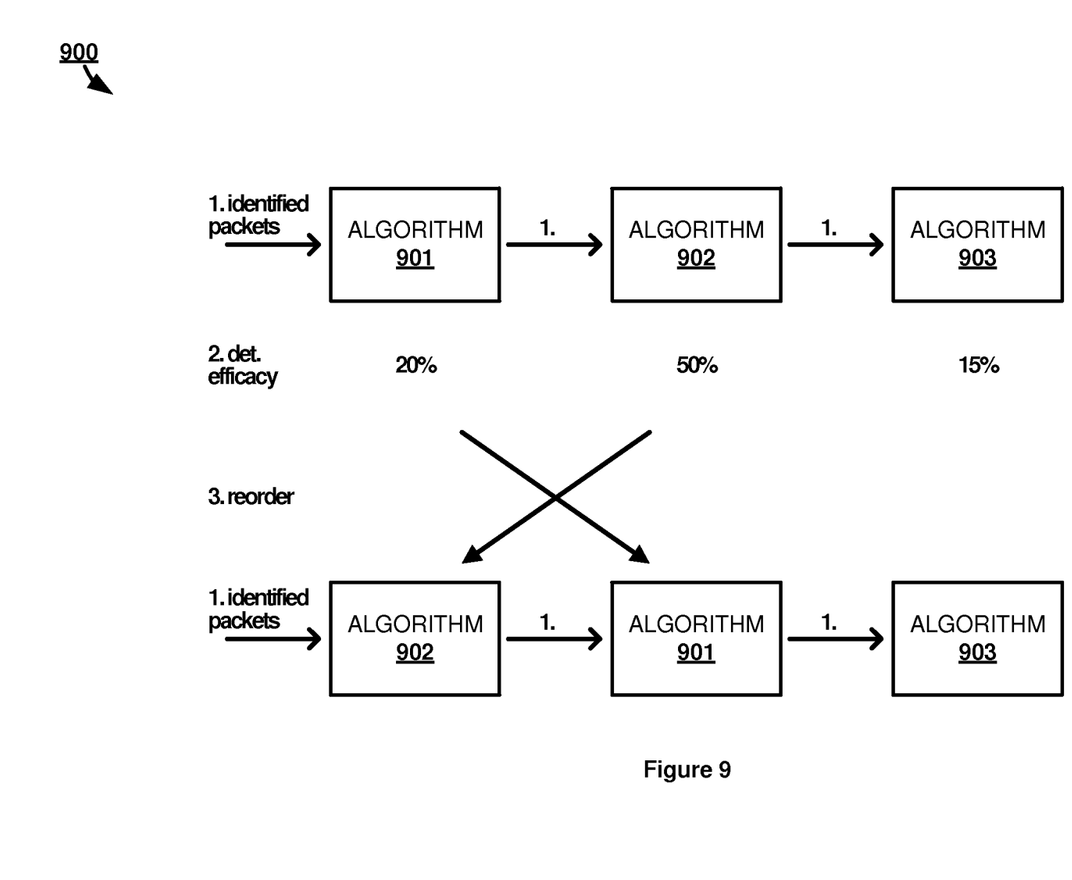
FIG. 9 illustrates a workflow and an operation of the network communication environment to selectively analyze traffic at a communication network edge.

Additionally, the different packet characteristics of the WebRTC media packets indicates to online policy enforcer 421 that security workflow 900 should be used to analyze those packets instead of security workflow 800 as was used in scenario 600. FIG. 9 illustrates workflow 900 that online policy enforcer 421 uses to process the sampled packets in scenario 700. Workflow 900 includes algorithms 901-903. Each algorithm 901-903 may analyze the packets for a different type of security threat, such as viruses, denial of service attacks, media type anomalies (e.g. not the SIP media that was expected from external communication system 405-1), or some other type of unwanted data—including combinations thereof.

FIG. 9 further provides a scenario for modifying security workflow 900 to account for processing results. At step 1, the packets are first processed by algorithm 901, then by algorithm 902, and then algorithm 903. If during any algorithm a packet is determined to be a threat, then the packet is rejected. In some cases, an algorithm may apply to each packet individually while in other cases the algorithm may consider multiple packets, as may be the case if, for example, the algorithm is designed to find a pattern or trend within the packets. The results of the algorithms processing of the packets are tracked and, at step 2, the efficacy of each algorithm is determined. The efficacy of each algorithm may be based on the processing packets sampled from one media stream operated on by workflow 900 (e.g. the media stream from external communication system 405-3, packets sample from all media streams operated on by workflow 900, or some portion of packets operated on by workflow 900. In this example, algorithm 901 identified 35% of the rejected packets, algorithm 902 identified 50% of the rejected packets, and algorithm 903 identified 15% of the rejected packets.

Based on the above efficacy determinations, workflow 900 is modified at step 3 to optimize the sequence of algorithms therein. Specifically, the order of algorithms 901 and 902 is swapped because more rejected packets are identified by algorithm 902 than algorithm 901. Since algorithms 901-903 are performed on packets in sequence, identifying packets for rejection earlier in the sequence means that the identified packets do not need to be processed by subsequent algorithms. Thus, as is accomplished by reordering algorithms 901 and 902, it is more efficient to forward weigh algorithms in a workflow based on efficacy of those algorithms. After reordering, which can happen as workflow 900 continues to run, step 1 continues so that algorithms 901-902, now in a different order, processes the sampled packets.

It should be understood that the reordering of workflow 900 is merely an example of how workflows can be modified. In other examples, algorithms may be added or subtracted from the workflow based on their efficacy, the algorithms themselves may be adjusted, or some other way in which a workflow can be changed may occur—including combinations thereof. Additionally, online policy enforcer 421 may perform all of the steps described above to modify workflow 900 or some portion of the steps may be offloaded to offline policy manager 422 or some other system. For example, online policy enforcer 421 may transfer rejection information (e.g. rejection statistics that can be used to determine efficacy) to offline policy manager 422, which determines whether workflow 900 should be modified and modifies workflow 900 accordingly.

Referring back to scenario 700, packets that are not rejected during the application of workflow 900 are allowed to continue on to media communication system 423. Those packets that are rejected are not allowed to enter enterprise network 404. Also, packets associated with the rejected packets may be rejected from entering enterprise network 404. Accordingly, for example, if any packets of the media stream from external communication system 405-3 are rejected, then the entire media stream may be rejected as well. Likewise, other packets from the same network as external communication system 405-3 may be rejected in addition to those from external communication system 405-3.

While online policy enforcer 421 is performing steps 1-4 in real-time, offline policy manager 422 receives copies of the WebRTC media packets at step 5. The media packets are then processed to determine whether the current sampling policy being used by online policy enforcer 421 in step 2 is adequately assessing the risks on enterprise network 404 and adjusts that policy if necessary at step 6. The adjusted sampling policy, if there is one, is then sent to online policy enforcer 421 at step 7 for use during the real-time sampling by online policy enforcer 421 at step 2. It should be understood, that scenario 700 may be occurring concurrently scenario 600 as part of a larger operation. That is, scenarios 600 and 700 indicate how two individual exemplary media streams are handled by edge system 401 while edge system 401 is also performing similar steps on all received media streams. As such, the sampling policy described in both scenarios 600 and 700 may be the same sampling policy used to determine how packets having many different characteristics should be sampled.

Figure 10:
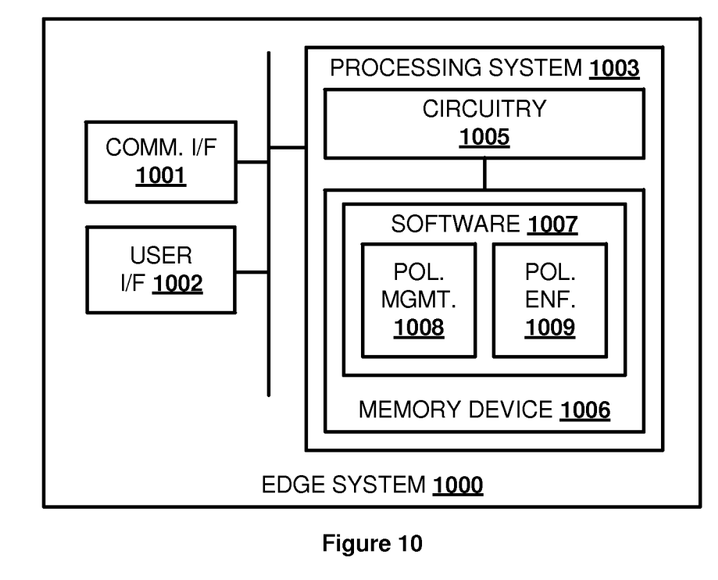
FIG. 10 illustrates an edge system for selectively analyzing traffic at a communication network edge.

FIG. 10 illustrates edge system 1000. Edge system 1000 is an example of edge systems 101 and 401, although systems 101 and 401 may use alternative configurations. Edge system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes policy management module 1008 and policy enforcement module 1009. Operating software 1007 may further include an operating system, utilities, drivers, network interfaces, applications, or some other type of software. When executed by circuitry 1005, operating software 1007 directs processing system 1003 to operate edge system 1000 as described herein.

In particular, policy management module 1008 directs processing system 1003 to process a first portion of data packets directed into the communication network from outside of the communication network to determine whether a first sampling policy adequately assesses risk to the communication network. Upon determining that the first sampling policy does not adequately assess the risk to the communication network, policy management module 1008 directs processing system 1003 to adjust the first sampling policy. Policy enforcement module 1009 directs processing system 1003 to identify a second portion of the data packets based on the first sampling policy, wherein an amount of data packets included in the first portion of the data packets is larger than or equal to an amount of data packets included in the second portion of the data packets.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of analyzing traffic at an edge of a communication network, the method comprising:
   in an offline policy manager of an edge system that handles data packets directed into the communication network from outside the communication network, processing a first portion of the data packets to determine whether a first sampling policy adequately assesses risk to the communication network, wherein the first sampling policy indicates which of the data packets should be processed in real-time before being allowed into the communication network;
   upon the offline policy manager determining that the first sampling policy does not adequately assess the risk to the communication network, adjusting the first sampling policy;
   in an online policy enforcer of the edge system, identifying a second portion of the data packets based on the first sampling policy while allowing not-identified ones of the data packets into the communication network, wherein an amount of data packets included in the first portion of the data packets is larger than or equal to an amount of data packets included in the second portion of the data packets;
   in the online policy enforcer, processing the second portion of the data packets in real-time to determine whether to reject any of the second portion of the data packets from entering the communication network; and
   in the online policy enforcer, allowing non-rejected packets of the second portion of the data packets into the communication network.

2. The method of claim 1, wherein processing the second portion of the data packets comprises:
   performing a first security workflow on at least a subset of the second portion of the data packets; and
   rejecting unsecure packets of the second portion of the data packets in accordance with the first security workflow.

3. The method of claim 2, further comprising:
   upon determining that at least one process of the first security workflow should be reordered, reordering the at least one process within the first security workflow.

4. The method of claim 3, wherein:
   determining that the at least one process of the first security workflow should be reordered comprises determining that the at least one process detects more of the unsecure packets than a second process positioned before the at least one process in order of the first security workflow; and reordering the at least one process within the first security workflow comprises ordering the first security workflow such that the at least one process is positioned before the second process in the first security workflow.

5. The method of claim 2, wherein adjusting the first sampling policy comprises:

performing a second security workflow on the first portion of data packets.

6. The method of claim 2, wherein the data packets represent a plurality of media streams and the second portion of the data packets represents a first media stream of the plurality of media streams.

7. The method of claim 1, wherein adjusting the first sampling policy comprises:

balancing a potential security risk on the communication network with processing resources required for each of a plurality of possible packet amounts for the second portion of the data packets.

8. The method of claim 1, wherein the first portion of the data packets comprises all of the data packets.

9. The method of claim 1, further comprising:

receiving the first sampling policy from a user.

10. An edge system to analyze traffic at an edge of a communication network, the edge system comprising:

a communication interface configured to receive data packets directed into the communication network from outside of the communication network;

a processing system, including processing circuitry, configured to:

process a first portion of the data packets in an offline policy manager to determine whether a first sampling policy adequately assesses risk to the communication network, wherein the first sampling policy indicates which of the data packets should be processed in real-time before being allowed into the communication network, adjust the first sampling policy upon the offline policy manager determining that the first sampling policy does not adequately assess the risk to the communication network, in an online policy enforcer, identify a second portion of the data packets based on the first sampling policy while allowing not-identified ones of the data packets into the communication network, wherein an amount of data packets included in the first portion of the data packets is larger than or equal to an amount of data packets included in the second portion of the data packets, in the online policy enforcer, process the second portion of the data packets in real-time to determine whether to reject any of the second portion of the data packets from entering the communication network; and in the online policy enforcer, allow non-rejected packets of the second portion of the data packets into the communication network.

11. The edge system of claim 10, wherein to process the second portion of the data packets, the processing system is configured to:

perform a first security workflow on at least a subset of the second portion of the data packets and reject unsecure packets of the second portion of the data packets in accordance with the first security workflow.

12. The edge system of claim 11, further comprising:

the processing system configured to reorder at least one process within the first security workflow upon determining that the at least one process of the first security workflow should be reordered.

13. The edge system of claim 12, wherein:

the processing system configured to determine that the at least one process of the first security workflow should be reordered comprises the processing system configured to determine that the at least one process detects more of the unsecure packets than a second process positioned before the at least one process in order of the first security workflow; and the processing system configured to reorder the at least one process within the first security workflow comprises the processing system configured to order the first security workflow such that the at least one process is positioned before the second process in the first security workflow.

14. The edge system of claim 11, wherein the processing system configured to adjust the first sampling policy comprises:

the processing system configured to perform a second security workflow on the first portion of data packets.

15. The edge system of claim 11, wherein the data packets represent a plurality of media streams and the second portion of the data packets represents a first media stream of the plurality of media streams.

16. The edge system of claim 10, wherein the processing system configured to adjust the first sampling policy comprises:

the processing system configured to balance a potential security risk on the communication network with processing resources required for each of a plurality of possible packet amounts for the second portion of the data packets.

17. The edge system of claim 10, wherein the first portion of the data packets comprises all of the data packets.

18. The edge system of claim 11, further comprising:

a user interface configured to receive the first sampling policy from a user.

* * * * *